United States Patent [19]
Banker et al.

[11] Patent Number: 6,005,938
[45] Date of Patent: Dec. 21, 1999

[54] PREVENTING REPLAY ATTACKS ON DIGITAL INFORMATION DISTRIBUTED BY NETWORK SERVICE PROVIDERS

[75] Inventors: Robert O. Banker, Cumming; Glendon L. Akins, III, Lawrenceville, both of Ga.

[73] Assignee: Scientific-Atlanta, Inc., Norcross, Ga.

[21] Appl. No.: 08/767,535

[22] Filed: Dec. 16, 1996

[51] Int. Cl.[6] .................................................. H04N 7/16
[52] U.S. Cl. .............................................................. 380/20
[58] Field of Search ................................................. 380/20

[56] References Cited

U.S. PATENT DOCUMENTS

| | | |
|---|---|---|
| 4,358,672 | 11/1982 | Hyatt et al. . |
| 4,823,385 | 4/1989 | Hegendörfer . |
| 5,249,230 | 9/1993 | Mihm, Jr. . |
| 5,282,248 | 1/1994 | DeJoy . |
| 5,402,490 | 3/1995 | Mihm, Jr. . |
| 5,440,633 | 8/1995 | Augustine et al. . |
| 5,524,052 | 6/1996 | Augustine et al. . |
| 5,671,276 | 9/1997 | Eyer et al. .................... 380/4 |
| 5,857,020 | 1/1999 | Peterson, Jr. ................. 380/4 |

*Primary Examiner*—Gilberto Barrón, Jr.
*Attorney, Agent, or Firm*—Kenneth M. Massaroni; Hubert J. Barnhardt III; Kelly A. Gardner

[57] ABSTRACT

A technique for preventing replay attacks on digital information distributed by network service providers. At the beginning of a subscription period for a service, a network service provider sends entitlement messages to the subscriber which provide the subscriber for the service with a session key and authorization information. The authorization information specifies a service and a period of time. When an encrypted instance of a service is distributed on the network, it is accompanied by a series of entitlement control messages. Each of the messages includes a value which can be used with the session key to obtain a control word for decrypting the encrypted instance and a time specifier. The subscriber equipment which decrypts the instance of the service does so only if the time specifier in the entitlement control message specifies a time within the time period specified by the authorization information.

42 Claims, 4 Drawing Sheets

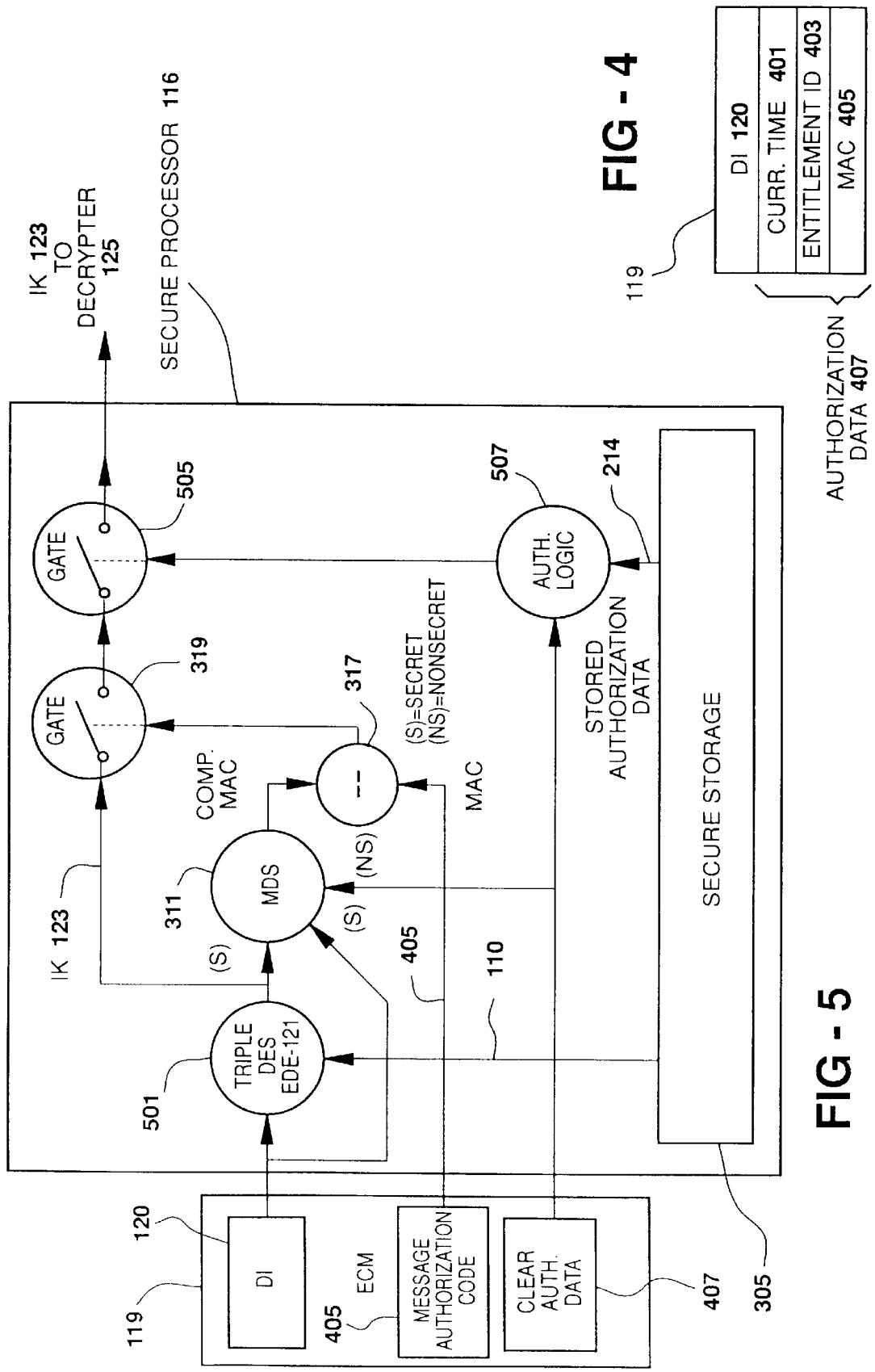

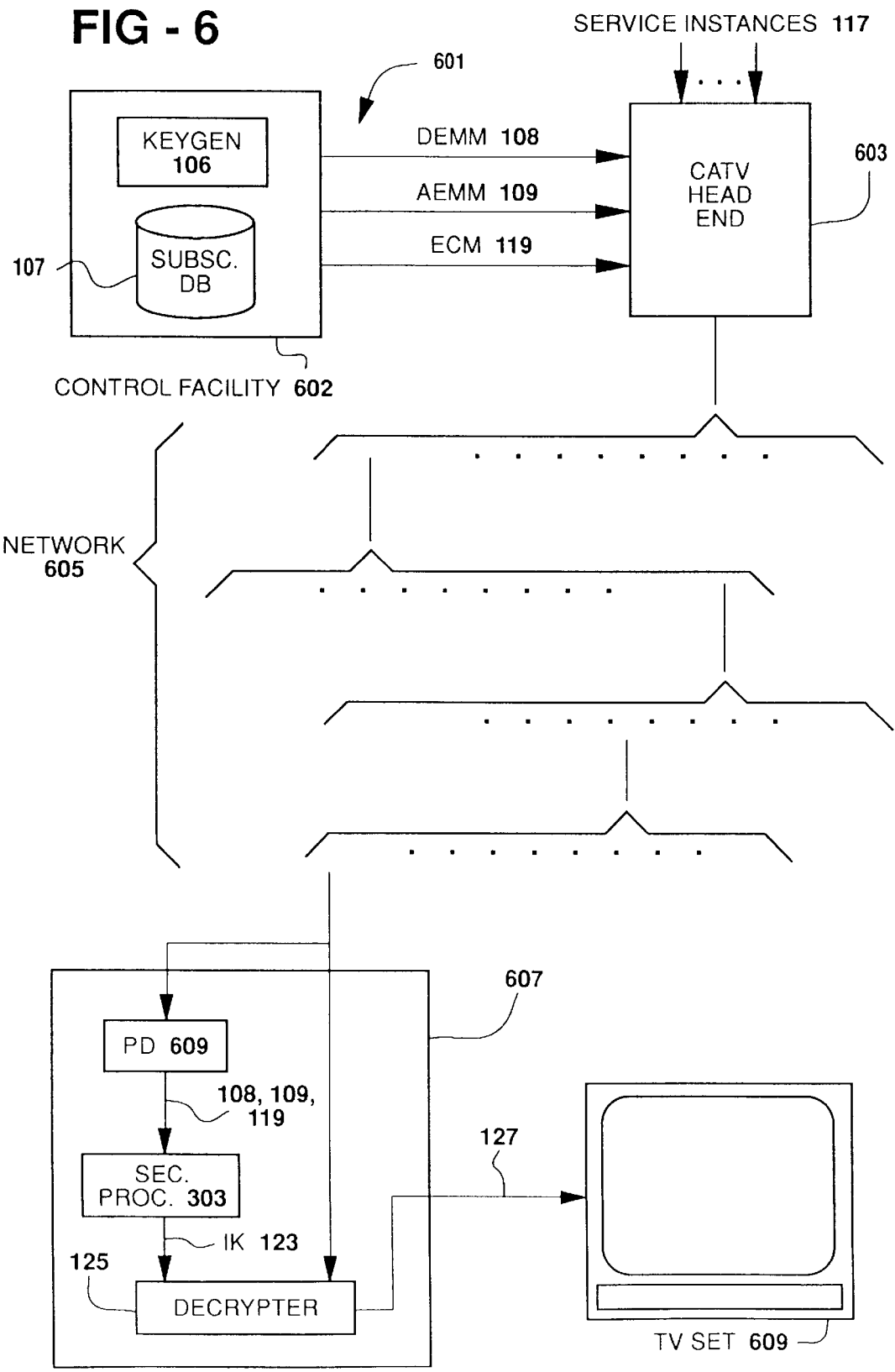

PREVENTING REPLAY ATTACKS ON DIGITAL INFORMATION DISTRIBUTED BY NETWORK SERVICE PROVIDERS

CROSS REFERENCES TO RELATED APPLICATIONS

BACKGROUND OF THE INVENTION

1. Field of the Invention

The invention generally concerns protecting digital information that is provided to users of a network by network service providers and more specifically concerns protecting the information against the class of attacks termed replay attacks, that is, attacks which work by replaying decryption information that the user received while he was subscribed to a service to decrypt information from the service after he has dropped his subscription.

2. Description of the Prior Art: FIG. 1

FIG. 1 shows how network service providers currently protect information which they distribute as part of a service from being viewed by network users who have not paid for the service. A service provider 105 employs network 111 to provide instances of services to a device 113 which is in the possession of a service subscriber who has subscribed for a period of time to one or more services provided by service provider 105. Device 113 may take many forms. For example, if service provider 105 is a Community Antenna Television (CATV) broadcaster and network 111 is a CATV network, device 113 may be a set-top box; if service provider 105 is providing the service over the Internet, the device 113 may be a personal computer. As used here, an instance of a service is a single one of the items provided by the service. For example, if the subscriber has subscribed for a service that offers a series of baseball games, each of the games is a single instance of the service.

Service provider 105 ensures that only subscribers to a service are able to view instances of the service by using encryption techniques as shown in FIG. 1. The techniques require two transactions: a first transaction 101 takes place at the beginning of each subscription period, typically at the beginning of each month; the second transaction 103 takes place each time an instance of a service is distributed over network 111. In transaction 101, service provider 105 reads a subscriber data base 107 to determine for each subscriber which services the subscriber is to receive in the coming subscription period. When service provider 105 has determined what services the subscriber is entitled to, service provider 105 makes at least two entitlement messages (EMMs) and sends them to the subscriber's device 113. There are two kinds of EMM: a decryption EMM (DEMM) 108 which contains a session key (SK) 10 that will be used later to decrypt instances of one or more services to which the subscriber is entitled, and an authorization EMM (AEMM) 109 which contains a specification of the services the subscriber is entitled to. The specification appears in FIG. 1 as AL 112. Each subscription period, the subscriber receives DEMMs 108 and AEMMs 109 as required for the services the subscriber has subscribed to. Service subscriber device 113 stores the session keys 110 and the authorization information (AI) 112 received in the EMMs in secure memory 114. The saved information from the EMMs appears in FIG. 1 as SEMI 115.

A transaction 103 occurs each time service provider 105 sends an instance of the service to subscribers. What service provider 105 sends is of course an encrypted instance 117 of the service. In association with encrypted service instance 117, service provider 105 sends a series of entitlement control messages (ECMs) 119. Each ECM 119 corresponds to a part of encrypted service instance 117. An ECM 119 contains two kinds of information: one kind identifies the service that encrypted service instance 117 is an instance of; the other, shown in FIG. 1 as decryption information (DI) 120, is information which, when combined with the session key 110 stored in SEMI 115, permits decryption of encrypted service instance 117 in service subscriber device 113. When service subscriber device 113 receives ECM 119, it provides it to secure processor 116, which takes ECM 119 and SEMI 115 and uses the information contained therein as inputs to entitlement check module 121. Entitlement check module 121 first determines whether service instance 117 is an instance of one of the services currently authorized in SEMI 115 for the user. If it is, entitlement check module 121 employs decryption information 120 and session key 110 to obtain instance key (IK) 123. Instance key 123 is often termed a control word in the arts to which the invention pertains. IK 123 is then used in decrypter 125 to decrypt encrypted service instance 117. Decrypted service instance 127 is thereupon provided to the user. The use of a series of ECMs 119 with a single service instance 117 ensures that instance key 123 will change repeatedly while the service instance 117 is being broadcast and thereby reduces the incentive to a subscriber to make a copy of instance key 123 and distribute it electronically to others who would like to watch service instance 117 but have not paid for it. For further details on the kinds of systems just described, see *Specification des systemes de la famille MAC/paquets*, Document Technique 3258, Bruxelles: Centre technique de l'UER/EBU, October 1986.

As is the case with any encryption scheme, the encryption scheme of FIG. 1 may be subject to various attacks by users who want access to an instance of a service but do not want to pay the subscription price for it. One such attack is the replay attack outlined above. There are two variants of the attack. In the first variant, the pirate orders all services for the first month. The result is a transaction 101 in which the pirate receives EMMs for month one authorizing the full set of services. The pirate saves the AEMM 109 for that month. The second month, the pirate orders just enough services to receive a DEMM 108 with a session key 110 for the desired service. The pirate allows session keys 110 to be processed by his subscriber device 113, but instead of providing the new month's AEMM 109, he provides the saved AEMM 109. At this point SEMI 115 has the session key for the second month together with the authorization information for the first month, and the pirate can thus decrypt instances of services in the second month even though he has not paid for them for that month.

In the second variant, the pirate has the minimum subscription for the first month. He records instances of an encrypted digital service that he has not subscribed to together with the ECMs 119 belonging to the instances. He also saves the current month's DEMM 108. The next month the pirate orders a subscription that includes the service that provided the copied instances. When the pirate receives the AEMM 109 for the next month, he provides it together with last month's DEMM 108 to subscriber device 113. Having done this, the pirate also provides one of the saved instances of the digital service together with its ECMs 119 to subscriber device 113. Since SEMI 115 in subscriber device 113 now has both a session key 110 for the digital service to which the saved instance belongs and an authorization for that service, subscriber device 113 is able to use the ECMs 119 to decrypt the saved instance. It is an object of the invention disclosed herein to provide apparatus and methods for preventing such replay attacks.

SUMMARY OF THE INVENTION

The invention deals with replay attacks by adding time information to the AEMM and the ECM. The AEMM contains a period specifier which specifies a period of time for which the AEMM is valid in addition to the service authorization information. When the service subscriber device receives the AEMM, it stores the period specifier and the service authorization information. When the service provider sends an instance of a service to the service subscriber device, it also sends an ECM. In addition to first decryption information and an identifier for the service the instance belongs to, the ECM of the invention contains a time value. When the service subscriber device receives the ECM, it uses the identifier for the service from the AEMM and the service authorization information from the ECM to verify that the subscriber is entitled to receive instances of the service and the period of time specifier from the AEMM and the time value from the ECM to verify that the AEMM is valid for the instance of the service associated with the ECM. If both verifications succeed, the service subscriber device uses previously received decryption information, and the first decryption information from the ECM to produce an instance key. Then the service subscriber device uses the instance key to decrypt or descramble the instance of the service.

Other aspects of the invention include techniques for encrypting the AEMM and techniques for deriving the instance key from the first and second decryption information.

The foregoing objects and advantages of the invention will be apparent to those skilled in the arts to which the invention pertains upon perusal of the following Detailed Description and drawing, wherein:

BRIEF DESCRIPTION OF THE DRAWINGS

FIG. 4 is a diagram of an ECM 119 in a preferred embodiment;

FIG. 5 is a diagram of how an ECM 119 is processed in a secure processor in a preferred embodiment; and FIG. 6 is a diagram of a CATV system which employs the invention.

Figure 1:
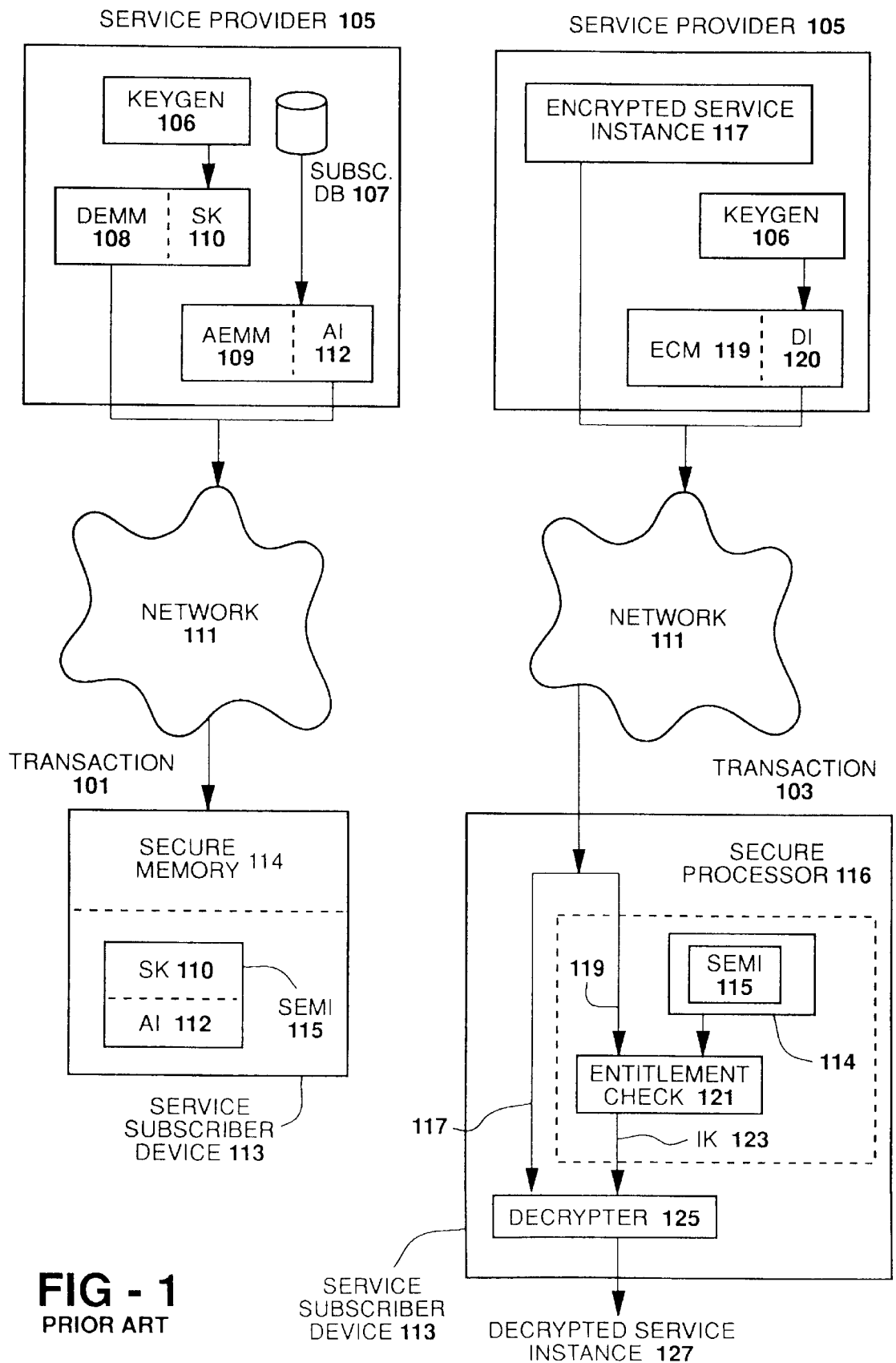
FIG. 1 is a block diagram of prior-art techniques used to protect instances of services.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description will first show the EMMs employed in a preferred embodiment of the invention, will then show how the information in the EMMs is processed in a secure processor in the preferred embodiment, will next show an ECM 119 which is employed in the preferred embodiment, and will thereupon show how the secure processor uses the information from the EMMs and ECM 119 to detect and prevent replay attacks on the encryption system. Finally, the Detailed Description will show how the invention may be deployed in a CATV system.

Figure 2:
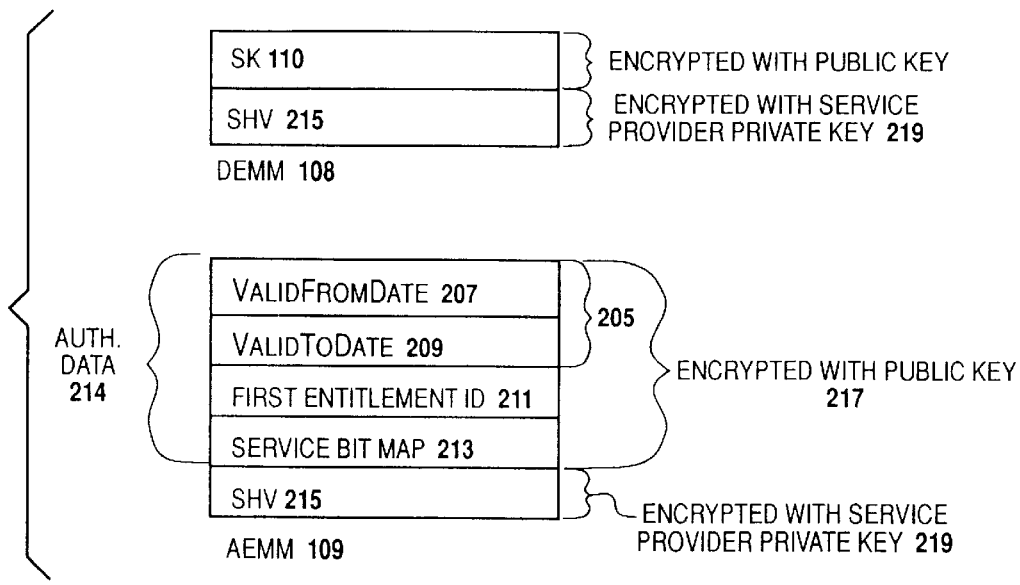
FIG. 2 is a diagram of a DEMM 108 and an AEMM 109 in a preferred embodiment.

EMMs: FIG. 2

FIG. 2 shows the relevant portions of DEMM 108 and AEMM 109 in a preferred embodiment. DEMM 108 contains a session key 110 for one or more services selected by the subscriber for the subscription period that DEMM 108 corresponds to. In a preferred embodiment, a given session key may be used to decrypt instances of more than one service; in other embodiments, there may be a one-to-one correspondence between session keys and services.

DEMM 108 in a preferred embodiment is protected against tampering by a number of standard encryption techniques. One of these is the use of a message digest to ensure that the contents of DEMM 108 have not been tampered with. A message digest is a value which is significantly shorter than the message itself, but is related to the message such that if the message changes, the message digest changes. In a preferred embodiment, the message digest is secure hash value (SHV) 215. Secure hash value 215 is made by means of a hash function from the current value of session key 110. As will be explained in more detail later, when DEMM 108 arrives in device 113, session key 110 is again hashed using the same hash function. If the hash value is different from the hash value in field 215, DEMM 108 has changed, either because of a transmission error or because someone has tampered with it. Session key 110 is further encrypted using a public key for device 113, while secure hash value 215 is encrypted with a private key 219 known only to the service provider. For details on the encryption techniques used to protect the contents of DEMM 108, see Bruce Schneier, *Applied Cryptography*, John Wiley and Sons, New York, 1994.

AEMM 109 contains authorization data 214, which is the data used by entitlement checking module 121 to determine what services a subscriber is currently authorized to receive. The parts of authorization data 214 which are relevant to the present discussion are validation period specification 205, first entitlement ID 211, and service bit map 213. Validation period specification 205 in a preferred embodiment specifies a period of time for which AEMM 109 is valid by means of two items of data: ValidFromDate 207, which is the date AEMM 109 is valid from, and ValidToDate 209, which is the date AEMM 109 is valid to. In other embodiments, the validation period may be specified, for example, by only a beginning or end date, by a date and a value representing a period of time, or simply by a value representing a period of time. Additionally, the validation period specification may specify a period in which the subscriber may not receive instances of the service.

First Entitlement ID 211 and service bit map 213 together indicate what services the user of device 113 which receives AEMM 109 is entitled to. Service bit map 213 in a preferred embodiment is a 256-bit long data item in which bits(0..255) represent services provided by the service provider. The value of a given bit indicates whether the user of device 113 is entitled to the service represented by the bit. First Entitlement ID 211 maps a set of integers which currently represent the set of services provided by the service provider to the bits in service bit map 213. For example, if the integers representing the set of services have the range 500–756, First Entitlement ID 211 will have the value 500 and the service represented by an entitlement ID of 510 will map to bit(10) in service bit map 213. Like DEMM 108, AEMM 109 employs a secure hash value 215 as a digest and as in DEMM 108, authorization data 214 is encrypted with public key 217, while secure hash value 215 is encrypted with service provider private key 219.

Processing EMMs in User Device 113

Figure 3:
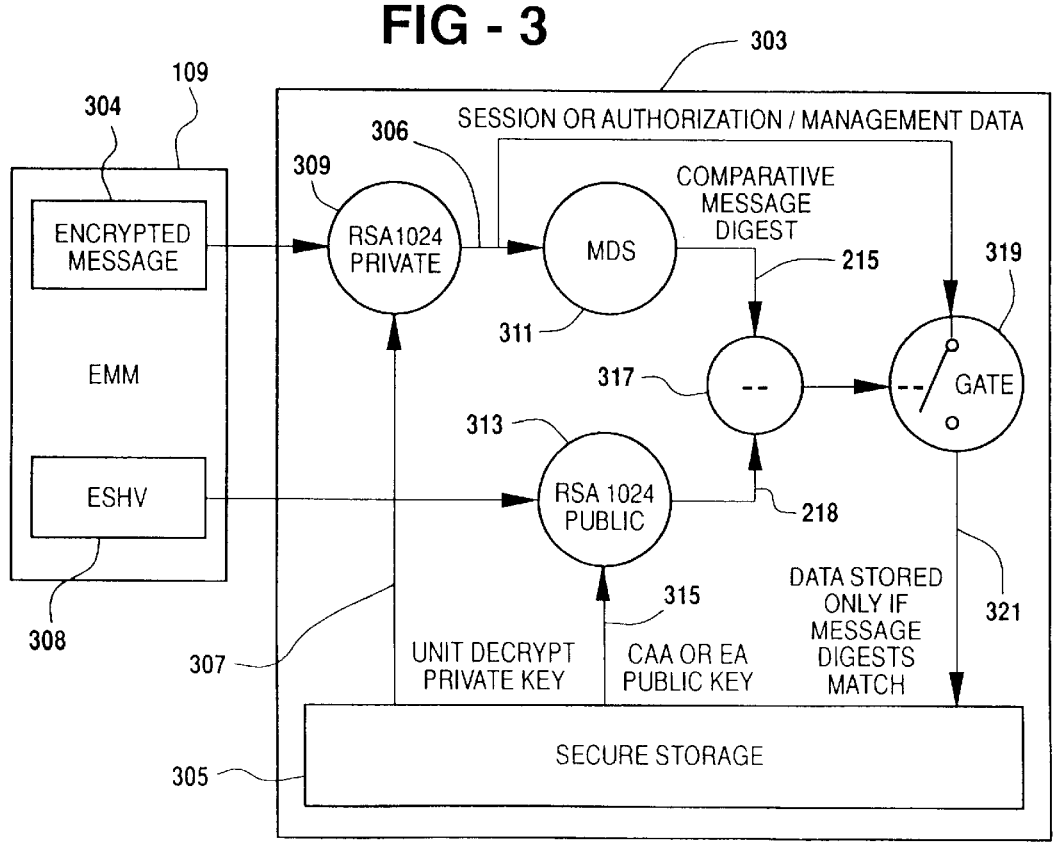
FIG. 3 is a diagram of how EMMs are processed in a secure processor in a preferred embodiment.

FIG. 3 shows how EMMs are processed in user device 113. Processing is done in secure processor 116, which may be implemented using a secure microprocessor and/or a secure ASIC. Secure in this context means that any attempt to tamper with microprocessor 303 and/or the ASIC will result in the loss of any information stored in the device. Also included in user device 113 is secure storage 305, which is tamper-resistant in the same fashion as microprocessor 303. Stored in secure storage 305 are the private key 307 which is used to decrypt messages encrypted with public key 217 and the public key 315 used to decrypt messages encrypted with private key 219.

When secure microprocessor 303 receives an EMM, it employs private key 307 to decrypt encrypted message 304 of EMM 109. In the case of a DEMM 108, message 304 is a session key 110 and in the case of an AEMM 109, it is authorization data 214. Message 304 is decrypted in decryption module 309 to produce decrypted message 306. Message 306 goes to hash module 311 which employs the same hash function to hash message 306 as was used in the service provider to hash message 306 in service provider 105. If message 306 is unchanged from what it was in service provider 105, the hash will produce the same hash value 215. In order to obtain the original hash value, which is stored in encrypted form at 308 in the EMM, secure microprocessor 303 uses public key 315 to decrypt encrypted secure hash value (ESHV) 308. The resulting secure hash value 218 is compared in module 317 with the hash value 215 produced at module 311. If they are the same, decrypted message 306 is identical to what was sent from service provider 105. When that is the case, the contents of message 306 are stored in secure storage 305, as shown by gate module 319 and arrow 321.

ECM 119: FIG. 4

FIG. 4 shows details of ECM 119 in a preferred embodiment. ECM 119 includes decryption information 120 and authorization data 407. In the preferred embodiment, decryption information 120 is an integer which may be used with a session key 110 for the service to which ECM 119's service instance belongs to (generate instance key 121 that will decrypt the portion of the service instance with which ECM 119 is associated. In other embodiments, decryption information 120 may be the encrypted instance key 121. In such embodiments, decryption of the encrypted instance key with session key 110 for the service will produce the instance key used to decrypt or descramble the service instance. The next field is current time 401, which contains a time stamp indicating the time at which the service instance with which ECM 119 is associated is to be distributed over network 111. Next is Entitlement ID 403, which indicates which service the service instance belongs to. MAC field 405, finally, is a message digest produced by a hash function from DI 120, current time 401, and Entitlement ID 403. As before, the purpose of MAC 405 is to ensure that ECM 110 arrives at user device 113 with contents identical to the ones it had when it was created in service provider 105.

Processing of ECM 119 in User Device 113: FIG. 5

FIG. 5 shows how ECM 119 is processed in secure microprocessor 303 of user device 113. First, decryption information 120 is encrypted in module 501 with session key 110 for the service to which the service instance associated with ECM 119 belongs to produce instance key 123. Then authorization data 407 and decryption information 120 go to module 311, where they are hashed in module 311 with the same hash function used to produce MAC 405 in ECM 119. If nothing has changed in ECM 119, the result has the same value as MAC 405. If that is the case, gate function 319 permits instance key 123 to pass on to gate function 505. Gate function 505 is in turn controlled by authorization logic 507, which compares authorization data 407 with stored authorization data 214. If the service identified by entitlement ID 403 is one of the services specified for user device 113 in service bit map 213 stored in SEMI 115 and current time 401 is within the period of time specified by valid period specifier 205 of SEMI 115, authorization logic 507 causes gating function 505 to output instance key 121 to decrypter 125, where it is used to decrypt the service instance associated with ECM 119. In a preferred embodiment, the index of the bit for the service in bit array 213 is computed by subtracting First Entitlement ID 211 in SEMI 115 from Entitlement ID 403.

As shown by the foregoing, the addition of validation period specification 205 to AEMM 109 and current time 401 to ECM 119 permits secure microprocessor 303 to determine whether the service instance was subscribed to in the period of time with which AEMM 109 is associated and thereby effectively counters both variants of the replay attack.

Employing the Invention in CATV Services: FIG. 6

One area in which embodiments of the invention may be employed with particular advantage is in providing instances of services via a CATV system. FIG. 6 shows a CATV system 601 in which the invention is employed. The main components of CATV system 601 are control facility 602, head end 603, network 605, set-top box 607, and TV set 609. Control facility 602 contains subscriber data base 107 and key generator 106 and provides DEMM 108, AEMM 109, and ECM 119 to head end 603. A given control facility 602 may serve one or more head ends 603. Head end 603 further receives service instances 117. Head end 603 sends EMMs and ECMs 119, as well as service instances 117, via network 605 to set-top box 607. Network 605 will generally employ coaxial cable or fiber cable to transmit information from head end 603 to set-top box 607, but may also employ ordinary telephone lines or microwave radio emanating from a transmission tower or a satellite. No matter how it is implemented, network 605 is a broadcast network in the sense that every set-top box connected to network 605 receives everything sent by head end 603 via network 605. Depending on the network implementation, there may further be communication between set-top box 607 and head end 603 or between set-top boxes and the set-top boxes 607 may be implemented in personal computers or other computer systems. Both EMMs and ECMs 119 are sent as packets of digital data, while service instance 117 may be sent either in digital or analog form.

As indicated above, EMMs are intended for individual subscribers. Each set-top box 607 consequently contains a packet detecting module 609 that detects packets sent on network 605. In the case of EMMs, packet detecting module 609 accepts an EMM only if it is directed to the set-top box 607 containing packet detecting module 609. When packet detecting module 609 detects such an EMM, it provides its contents to secure microprocessor 303, where it is processed as described above. Similarly, when packet detecting module 609 detects an ECM 119 on a channel currently being received by set-top box 607, it provides it to secure processor 303, which processes it as described above. If secure processor 303 determines that ECM 119 specifies an instance of a service that the subscriber to whom set-top box 607 belongs is entitled to receive, the secure processor uses ECM 119 and the information from the EMMs that the secure processor has received to produce instance key 123, which is in turn used in decrypter 125 to decrypt service instance 117 to produce decrypted service instance 127, which is sent to television set 609 or any other device which can display the service instance. If service instance 117 is in digital form, instance key 123 will be used directly to decrypt the digital data representing service 117; if service instance 117 is in analog form, it will be scrambled before it is output from head end 603 and instance key 123 will be used to control the behavior of the analog descrambler which will descramble service instance 117.

CONCLUSION

The foregoing Detailed Description has shown to those skilled in the art how a validation period specifier in an EMM and a time stamp in an ECM may be used to defeat attempts to obtain instances of services for free by replaying service authorization information that stems from a period of time which does not include the time at which the instance is sent. The inventor has further disclosed the best mode presently known to him of implementing the invention.

While the presently-known best mode is implemented in a CATV system, it will be immediately apparent to those skilled in the arts to which the invention pertains that the techniques described herein can be used in any system for distributing services across a network in which a subscriber signs up to receive instances of a given service over a specified period of time. The system in which the invention is used may distribute the services via any sort of broadcast network, but also via networks such as the Internet in which there is bidirectional communication via the network between the subscriber and the source of the service.

The preferred embodiment is implemented in a set-top box used with a CATV system, but could equally be implemented in a PC, in the TV set, or in any apparatus which is connected to a network used by a service provider and which has sufficient computational capability to perform the calculations required for the invention. It will further be apparent to those skilled in the art that the invention can be embodied in data structures other than the EMMs or ECMs disclosed herein and that different techniques than those disclosed herein can be used to encrypt the EMM or its equivalent and to generate an instance key from the information contained in the EMM and ECM.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of protecting a given encrypted instance of a service that a service provider provides via a network to a subscriber,
    the method being practiced in apparatus by means of which the subscriber accesses instances of the service for limited periods of time and the method comprising the steps of:
        receiving a first message from the service provider, the first message including at least a period specifier which specifies a given period of time and an authorization for the service;
        receiving a second message from the service provider, the second message being associated with the given instance and including at least an identification of the service, a time specifier which specifies a time, and first decryption information for the given instance;
        receiving the given instance; and
        using the first decryption information and second decryption information accessible to the apparatus to decrypt the given instance only if the identification of the service from the second message indicates the same service as the authorization therefor from the first message and the time specified by the time specifier from the second message is within the period specified by the period specifier from the first message.

2. The method set forth in claim 1 wherein:
    the period specifier specifies an expiration time; and
    the step of using the first and second decryption information is performed only if the time specified by the time specifier is no later than the expiration time.

3. The method set forth in claim 1 wherein:
    the period specifier specifies an earliest valid time; and
    the step of using the first and second decryption information is performed only if the time specified by the time specifier is later than the earliest valid time.

4. The method set forth in claim 1 wherein:
    the period specifier specifies the period by means of a first time and a second time; and
    the step of using the first and second decryption information is performed only if the time specified by the time specifier is in the period specified by the first time and the second time.

5. The method set forth in any of claims 1 through 4 wherein:
    any of the steps of receiving the first message or receiving the second message receives the first message or the second message from the network.

6. The method set forth in any of claims 1 through 4 wherein:
    the apparatus has an address for receiving messages;
    the method includes the step of storing the period specifier and the authorization in the apparatus; and
    the apparatus performs the step of storing only if the first message is addressed to the apparatus.

7. The method set forth in any of claims 1 through 4 wherein
    the apparatus includes a secure memory,
    the first message is encrypted, and
    the method further comprises the step of:
        decrypting the first message and storing the first message in the secure memory.

8. The method set forth in claim 7 wherein:
    the first message further includes a digest value which is a result of a function applied at least to the values of the period specifier and the authorization;
    the digest value is encrypted in the first message differently from the remainder of the first message; and
    the method further includes the steps of
        decrypting the digest value;
        using the function to derive a new digest value from at least the decrypted period specifier and authorization; and
        storing the decrypted period specifier and authorization in the secure memory only if the digest value and the new digest value are the same.

9. The method set forth in claim 8 wherein:
at least the period specifier and the authorization are encrypted using a public key belonging to the apparatus and the digest value is encrypted using a private key belonging to the service provider.

10. The method set forth in any of claims 1 through 4 wherein
the service provider provides a plurality of the services,
the authorization specifies a subset of the plurality of the services, and
the second decryption information includes a plurality of session keys for the plurality of services; and
the step of using the first and second decryption information employs a given one of the session keys corresponding to the service to which the instance belongs to decrypt the given instance and does not decrypt the given instance unless the identification of the service from the second message indicates one of the services specified in the authorization.

11. The method set forth in any of claims 1 through 4 wherein:
the second decryption information is an integer value;
the first decryption information is a session key; and
the step of using the first and second decryption information includes the steps of
using the integer value and the session key to generate an instance key for the given instance and
using the instance key to decrypt the instance.

12. A method of protecting a given encrypted instance of a service that a service provider
provides via a network to a subscriber,
the method comprising the steps performed by the service provider of:
sending a first message to apparatus by means of which the subscriber accesses instances of the service for limited periods of time, the first message including at least a period specifier which specifies a given period of time and an authorization for the service;
sending a second message to the apparatus, the second message being associated with the given instance and including at least an identification of the service, a time specifier which specifies a time, and first decryption information for the given instance, and
sending the given instance via the network to the apparatus, the apparatus using the first decryption information and second decryption information accessible to the apparatus to decrypt the given instance only if the identification of the service from the second message indicates the same service as the authorization therefor from the first message and the time specified by the time specifier from the second message is within the period specified by the period specifier from the first message.

13. The method set forth in claim 12 wherein:
the period specifier specifies an expiration time; and
the apparatus uses the first and second decryption information only if the time specified by the time specifier is no later than the expiration time.

14. The method set forth in claim 12 wherein:
the period specifier specifies an earliest valid time; and
the apparatus uses the first and second decryption information only if the time specified by the time specifier is later than the earliest valid time.

15. The method set forth in claim 12 wherein:
the period specifier specifies the period by means of a first time and a second time; and the apparatus uses the first and second decryption information only if the time specified by the time specifier is in the period specified by the first time and the second time.

16. The method set forth in any of claims 12 through 15 wherein:
any of the steps of sending the first message or sending the second message sends the first message or the second message via the network.

17. The method set forth in any of claims 12 through 15 wherein:
the apparatus has an address for receiving messages; and
the step of sending the first message sends the first message to the address.

18. The method set forth in any of claims 12 through 15 wherein
the apparatus includes a secure memory and the method further comprises the step of:
encrypting the first message,
the apparatus decrypting the first message and storing the first message in the secure memory.

19. The method set forth in claim 18 wherein the method further includes the steps of:
making a digest value which is a result of a function applied at least to the values of the period specifier and the authorization;
encrypting the digest value differently from the period specifier and the authorization; and
adding the encrypted digest value to the message,
the apparatus operating to decrypt the digest value, use the function to derive a new digest value from at least the decrypted period specifier and authorization, and store the decrypted period specifier and authorization in the secure memory only if the digest value and the new digest value are the same.

20. The method set forth in claim 19 wherein the step of encrypting the first message includes the steps of
encrypting at least the period specifier and the authorization using a public key belonging to the apparatus and encrypting the digest value using a private key belonging to the service provider.

21. The method set forth in any of claims 12 through 15 wherein
the service provider provides a plurality of the services,
the authorization specifies a subset of the plurality of the services, and
the second decryption information includes a plurality of session keys for the plurality of services; and
the apparatus employs a given one of the session keys corresponding to the service to which the instance belongs to decrypt the given instance and does not decrypt the given instance unless the identification of the service from the second message indicates one of the services specified in the authorization.

22. The method set forth in any of claims 12 through 15 wherein:
the first decryption information is an integer value;
the second decryption information is a session key; and
the apparatus uses the integer value and the session key to generate an instance key for the given instance and uses the instance key to decrypt the instance.

23. An entitlement management message used in a system for providing encrypted instances of services to subscribers via a network, the subscribers accessing the instances by means of apparatus coupled to the network and each subscriber having subscribed for access to instances of the service for a period of time, the entitlement management message comprising:
a period specifier which specifies the period of time and an authorization for the service;

the apparatus responding to the entitlement management message by storing the contents thereof for later use in determining whether to decrypt an instance of the service.

24. The entitlement management message set forth in claim 23 wherein:
the period specifier specifies an expiration time.

25. The entitlement management message set forth in claim 23 wherein:
the period specifier specifies an earliest valid time.

26. The entitlement management message set forth in claim 23 wherein:
the period specifier specifies the period by means of a first time and a second time.

27. The entitlement management message of claim 23 wherein:
the contents of the entitlement management message are encrypted,
the apparatus further responding to the entitlement management message by decrypting the contents thereof.

28. The entitlement management message of claim 27 further comprising:
a digest value which is a result of a function applied at least to the values of the period specifier and the authorization, the digest value being encrypted differently from the remainder of the first message.

29. The entitlement management message of claim 28 wherein:
at least the period specifier and the authorization are encrypted using a public key belonging to the apparatus and the digest value is encrypted using a private key belonging to the service provider.

30. The entitlement management message of claim 23 wherein:
the service provider provides a plurality of the services; and
the authorization specifies a subset of the plurality of the services.

31. An entitlement control message used in a system for providing encrypted instances of services to subscribers via a network, the subscribers accessing the instances by means of apparatus coupled to the network and each subscriber having subscribed for access to instances of the service for a period of time,
the entitlement control message being associated with an instance and comprising:
an identification of the service;
a time specifier which specifies a time; and
first decryption information for the given instance,
the apparatus using previously-stored second decryption information and the first decryption information to decrypt the given instance only if the identification of the service from the entitlement control message indicates the same service as a previously-stored authorization therefor and the time specified by the time specifier is within a period specified by a previously-stored period specifier.

32. The entitlement control message set forth in claim 31 herein:
the first decryption information is an integer value,
the second decryption information being a session key and the apparatus employing the integer value and the session key to generate an instance key and employing the instance key to decrypt the instance.

33. Apparatus coupled to a network for accessing encrypted instances of a service which a service provider provides to a subscriber via the network, the subscriber being permitted by the service provider to access instances of the service for limited periods of time and the apparatus comprising:
a receiver that receives messages and the instances from the service provider via the network;
a processor coupled to the receiver that processes the messages; and
a decrypter coupled to the processor and the receiver that decrypts the instances, the messages including
a first message including at least a period specifier which specifies a given period of time and an authorization for the service and
a second message associated with the given instance and including at least an identification of the service, a time specifier which specifies a time, and first decryption information for the given instance and
the receiver receiving the first and second messages and providing them to the processor,
the processor using the first decryption information and second decryption information accessible to the apparatus to enable the decrypter to decrypt an instance received in the receiver only if the processor determines that the identification of the service from the second message indicates the same service as the authorization therefor from the first message and the time specified by the time specifier from the second message is within the period specified by the period specifier from the first message.

34. The apparatus set forth in claim 33 wherein:
the period specifier specifies an expiration time; and
the processor uses the first and second decryption information to enable the decrypter to decrypt the instance only if the processor determines that the time specified by the time specifier is no later than the expiration time.

35. The apparatus set forth in claim 33 wherein:
the period specifier specifies an earliest valid time; and
the processor uses the first and second decryption information to enable the decrypter to decrypt the instance only if the processor determines that the time specified by the time specifier is at least as late as the earliest valid time.

36. The apparatus set forth in claim 33 wherein:
the period specifier specifies the period by means of a first time and a second time; and
the processor uses the first and second decryption information to enable the decrypter to decrypt the instance only if the time specified by the time specifier is within the period specified by the first time and the second time.

37. The apparatus set forth in any of claims 33 through 36 wherein:
the apparatus has an address for receiving messages;
the apparatus stores the period specifier and the authorization in the apparatus; and
the apparatus does the storing only if the first message is addressed to the apparatus.

38. The apparatus set forth in any of claims 33 through 36 wherein
  the apparatus includes a secure memory,
  the first message is encrypted, and
  the processor further decrypts the first message and stores the first message in the secure memory.

39. The apparatus set forth in claim 38 wherein:
  the first message further includes a digest value which is a result of a function applied to the values of the period specifier and the authorization;
  the digest value is encrypted in the first message differently from the remainder of the first message; and
  the processor further decrypts the digest value, uses the function to derive a new digest value from at least the decrypted period specifier and authorization, and stores the decrypted period specifier and authorization in the secure memory only if the digest value and the new digest value are the same.

40. The apparatus set forth in claim 39 wherein:
  the service provider encrypts at least the period specifier and the authorization using a public key belonging to the apparatus and encrypts the digest value using a private key belonging to the service provider.

41. The apparatus set forth in any of claims 33 through 36 wherein
  the service provider provides a plurality of the services,
  the authorization specifies a subset of the plurality of the services, and
  the second decryption information includes a plurality of session keys for the plurality of services; and
  the processor employs a given one of the session keys corresponding to the service to which the instance belongs to enable the decrypter to decrypt the given instance and does not enable the decrypter unless the identification of the service from the second message indicates one of the services specified in the authorization.

42. The apparatus set forth in any of claims 33 through 36 wherein:
  the first decryption information is an integer value;
  the second decryption information is a session key; and
  the processor uses the integer value and the session key to generate an instance key for the given instance and enables the decrypter by providing the instance key to the decrypter.

* * * * *